Figure 2:
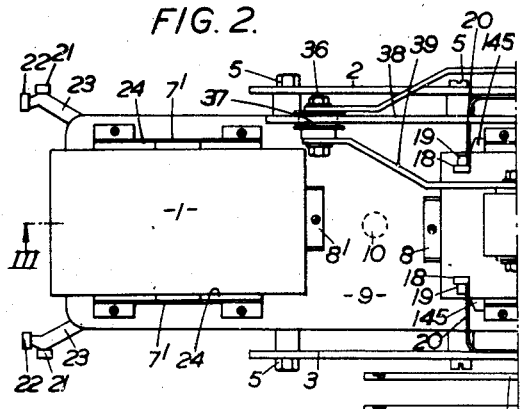

Oct. 29, 1946.　　　　D. BROIDO　　　　2,410,265
TABULATOR CONTROLLED BY SINGLE-LINE RECORDS
Filed May 19, 1942　　12 Sheets-Sheet 1
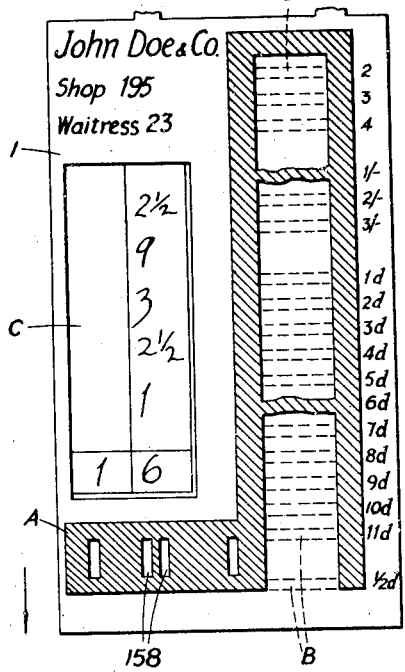
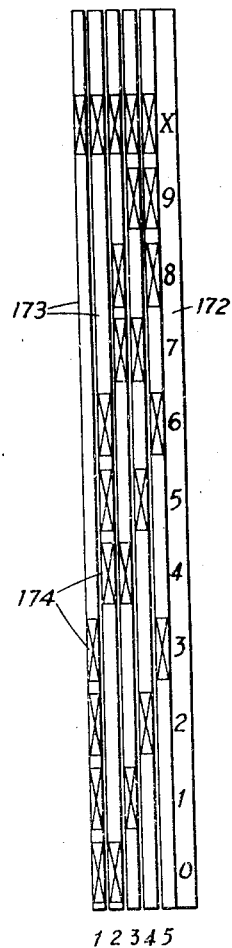
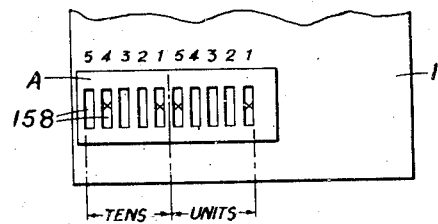
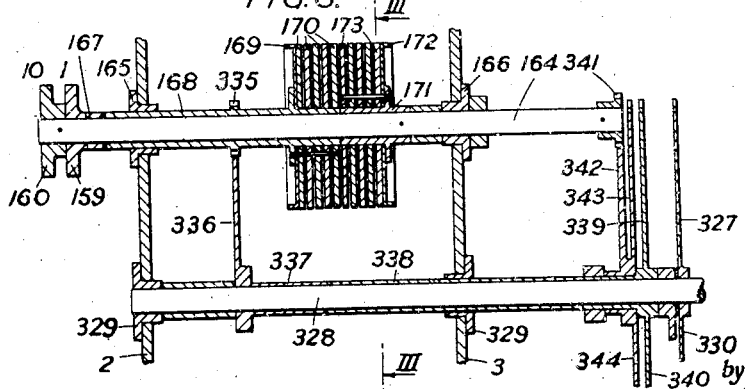
Inventor
Daniel Broido.
by
Attorney Oct. 29, 1946.　　　D. BROIDO　　　2,410,265
TABULATOR CONTROLLED BY SINGLE-LINE RECORDS
Filed May 19, 1942　　　12 Sheets-Sheet 2

Inventor
Daniel Broido
by
Attorney

Oct. 29, 1946.　　　　D. BROIDO　　　　2,410,265
TABULATOR CONTROLLED BY SINGLE-LINE RECORDS
Filed May 19, 1942　　　12 Sheets-Sheet 3

Inventor
Daniel Broido
by
A. Knight Leroad
Attorney

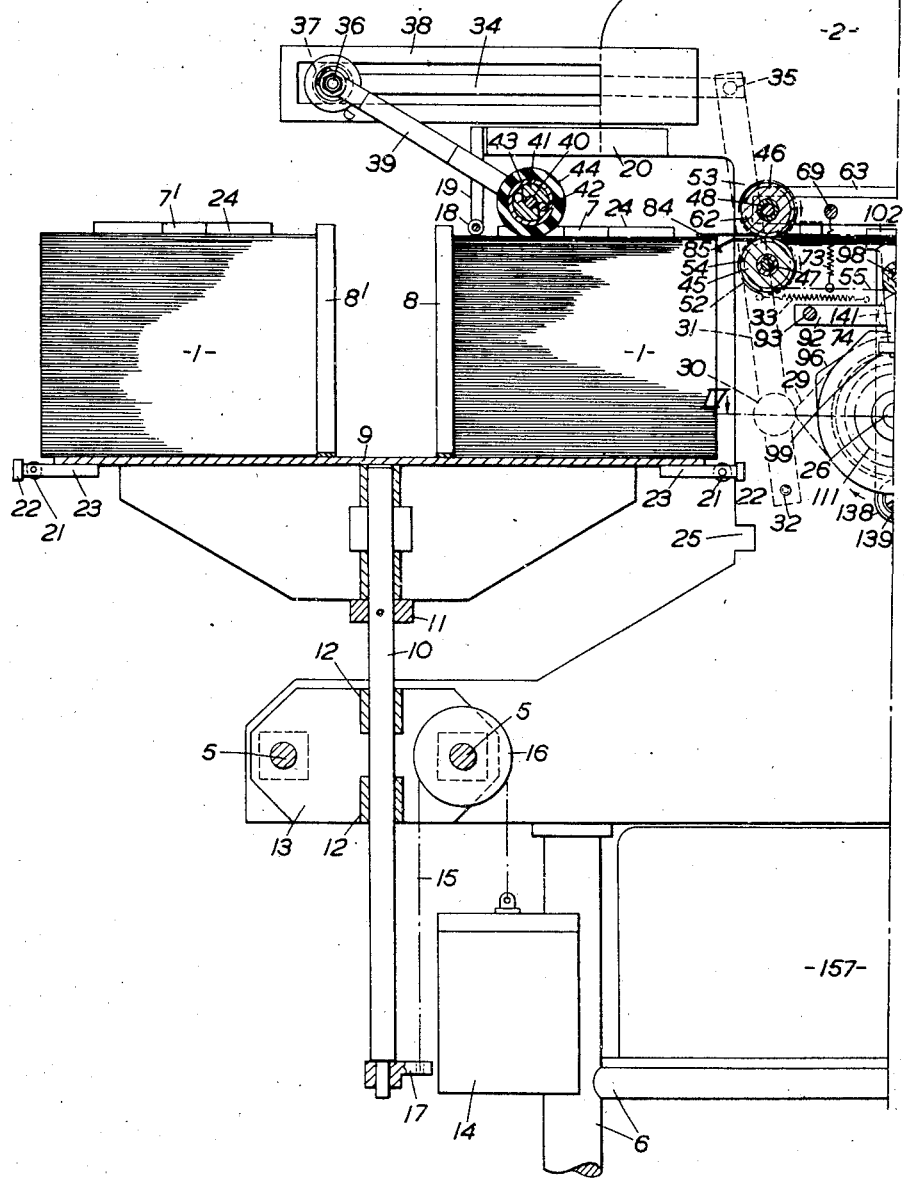

Oct. 29, 1946.    D. BROIDO    2,410,265
TABULATOR CONTROLLED BY SINGLE-LINE RECORDS
Filed May 19, 1942    12 Sheets-Sheet 5

Inventor
Daniel Broido
by
Attorney

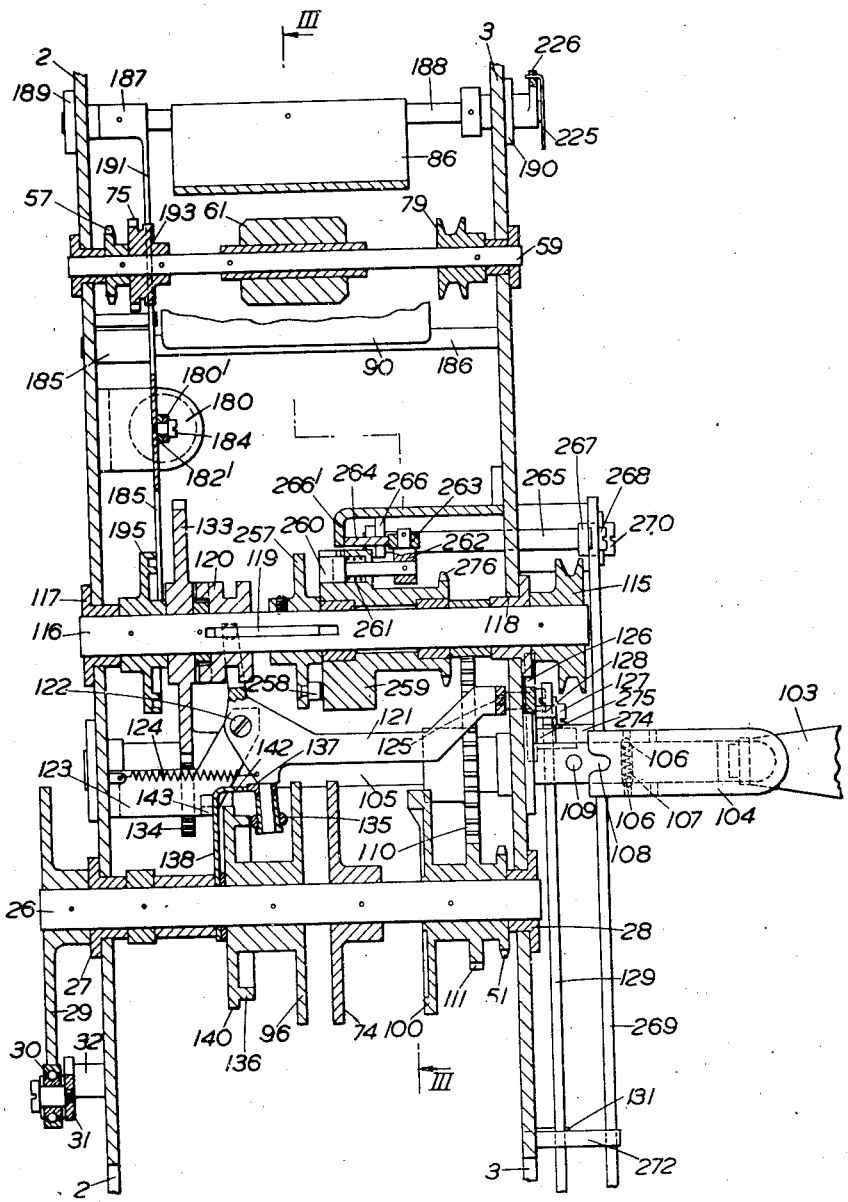

Oct. 29, 1946.    D. BROIDO    2,410,265
TABULATOR CONTROLLED BY SINGLE-LINE RECORDS
Filed May 19, 1942    12 Sheets-Sheet 8

FIG. 9.

Inventor
Daniel Broido
by
Attorney

Oct. 29, 1946.  D. BROIDO  2,410,265
TABULATOR CONTROLLED BY SINGLE-LINE RECORDS
Filed May 19, 1942   12 Sheets-Sheet 10

Inventor
Daniel Broido
by
A. Knight Lewad
Attorney

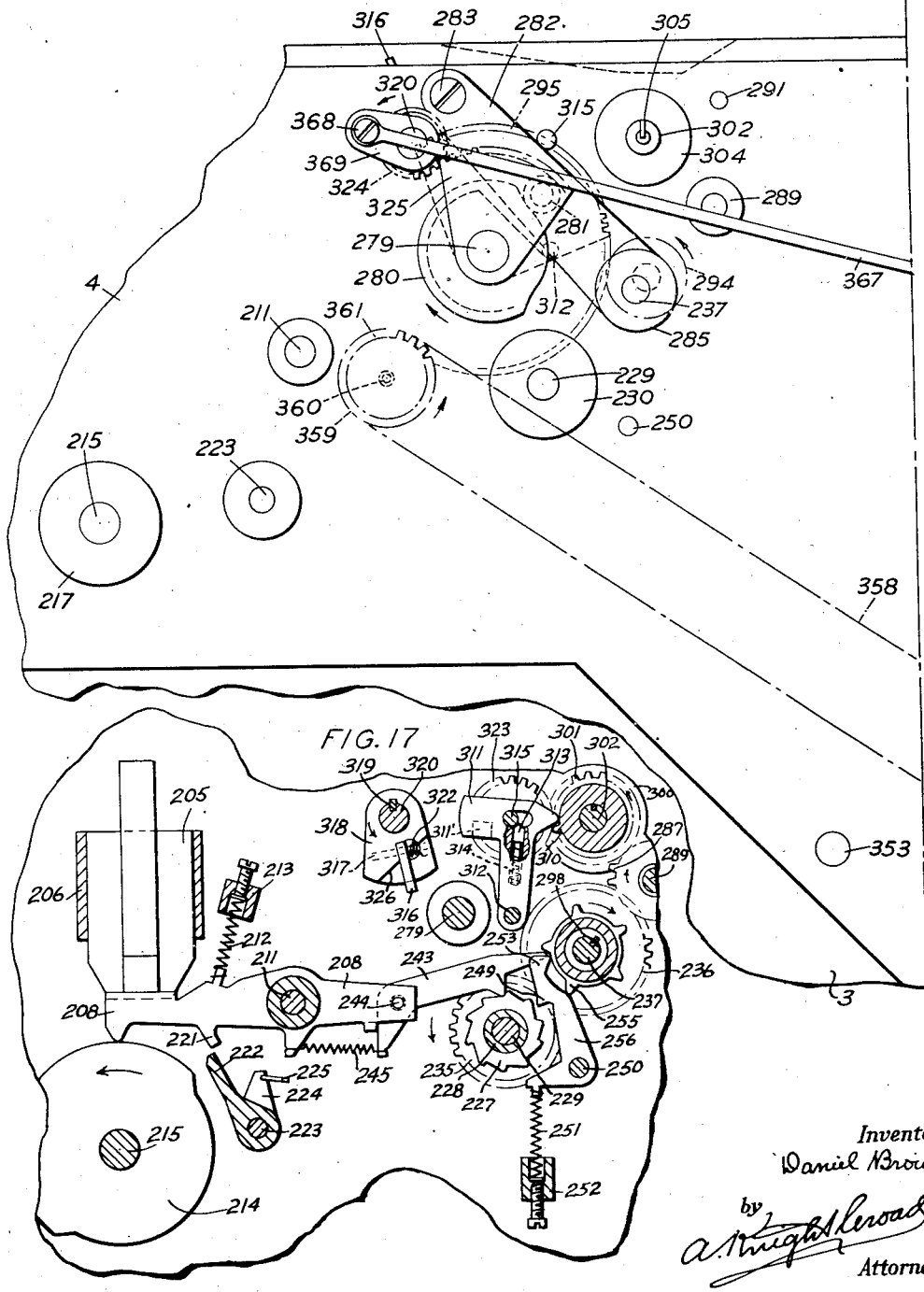

Oct. 29, 1946.　　　　D. BROIDO　　　　2,410,265
TABULATOR CONTROLLED BY SINGLE-LINE RECORDS
Filed May 19, 1942　　　12 Sheets-Sheet 12

Inventor
Daniel Broido
by
A. Knight Leroad
Attorney

Patented Oct. 29, 1946

2,410,265

UNITED STATES PATENT OFFICE 2,410,265

TABULATOR CONTROLLED BY SINGLE-LINE RECORDS

Daniel Broido, Cockfosters, near Barnet, England

Application May 19, 1942, Serial No. 443,653
In Great Britain September 24, 1941

6 Claims. (Cl. 235—61.7)

This invention relates to record-controlled statistical machines of the kind employing record cards conveying information represented by marked index areas arranged in denominational groups (hereinafter referred to as "of the kind described").

The primary object of the invention is to provide a machine of the kind described, more particularly a tabulating or automatic adding machine, of simple construction.

Another object is to construct a tabulating machine provided with a simple selective control device adapted to ensure that the tabulating mechanism is operated only by records which, firstly, are properly printed, properly fed, and unspoilt, and, secondly, have identification marks conforming to the selective set-up of the control device.

A further object of the invention is to provide a light-controlled statistical machine of simple construction adapted to check up and to tabulate marked records in the course of a single operation.

With the foregoing objects in view a record-controlled statistical machine of the kind described made according to the present invention comprises a mechanism for continuously feeding the records through a stationary analysing device adapted to analyse in successive order all denominational groups of index areas, and all index areas with each group, and to transmit the impulses produced by said marks to a control device adapted to control the drive of a plurality of denominational elements of a totalizing mechanism, a plurality of locking members driven in synchronism with the record feeding mechanism, each of said members being adapted to render one of said controlled totalizing elements operable by said control device when the associated denominational group of index areas reaches the analysing position, and to render it inoperable after the group of index areas has passed the analysing position, the amount of movement imparted to each driven totalizing element depending on the time interval between the operation of the corresponding totalizing element by the control device and the time it is rendered inoperative by the respective locking member, and a carry device for the totalizing mechanism.

The machine may comprise a stationary analysing device, means for feeding the records continuously through the analysing device in such a way that the marks thereon are analysed in successive denominational order by said analysing device, a plurality of totalizing elements, one for each denomination of the information to be registered, means for driving the totalizing elements, a control device actuated by the analysing device to control the drive to the totalizing elements in conformity with the respective denominational marks on the record, said control device comprising a single electromagnet controlling a plurality of armatures, each controlling respectively one of said denominational totalizing elements, means for rendering said armatures operative by the electromagnet in successive order and for restoring said armatures, said means operating in synchronism with the passage of the record through the analysing device, whereby each armature is free to operate as a denominational group of marks on the record with which it is associated is analysed by the analysing device, and a carry device associated with the totalizing elements.

The machine may be adapted for use with records bearing identification markings and may then comprise a second analysing device co-operating with said identification markings and with a locking device to lock said armatures in an inoperative position when the identification markings on a card passing through the machine either are different from a predetermined marking or are not accurately aligned relatively to said analysing device.

The second analysing device may comprise a source of radiant energy, a device sensitive to this radiant energy on to which the radiant energy is directed, means for varying the pattern of the beam of radiant energy impinging on the sensitive device in accordance with the pattern of a predetermined identification marking, and an electromagnet actuated by impulses from the sensitive device, and the locking device may comprise a member operable by said electromagnet to lock the armatures in an inoperative position.

The machine may further comprise a sorting flap operable by said electromagnet to segregate those records not having the predetermined identification marking corresponding to the pattern set up on the machine, or in which the identification marking is not accurately aligned relatively to the analysing device, said sorting flap being operatively coupled to said locking device, whereby said records are segregated without operating the totalizing elements.

The drive to the totalizing elements may be effected from a continuously driven member through couplings normally held inoperative by the armatures but operable immediately the restraint effected by the armatures is released to drive the totalizing elements.

The machine may be adapted for registering information in irregular denominations (such as £ s. d.) in which case the armatures may be controlled by a plurality of cams arranged respectively to permit the armatures to operate in properly timed sequence and shaped respectively to vary the periods before which the various armatures, once permitted to operate, are restored, whereby the totalizing elements of the various denominations can be driven during each operation of the machine for varying time intervals in conformity with the varying maximum denominational values.

If the machine is adapted for registering values in irregular denominations involving shillings and pence the cam associated with the armature controlling the half-penny denomination may be designed to permit the corresponding totalizing elements to be moved only one step each time the said armature is operated, whereupon the armature is immediately restored by the cam. The armature controlling the half-penny denomination may comprise a double escapement pawl co-operating with a frictionally driven ratchet wheel fixed to a totalizing element of the pence denomination.

The armatures controlling other denominations may each comprise a pawl-like member engaging a frictionally driven ratchet wheel fixed to a totalizing element of the corresponding denomination, the cams associated with said armatures permitting the respective pawls to be disengaged from their ratchet wheels sufficiently long during each revolution to enable the ratchet wheels to be moved the required number of steps up to a maximum.

Additional totalizing elements may be provided for the higher denominations, the drive to these additional totalizing elements being effected from a continuously driven member through frictional couplings controlled by a carry device.

The carry device may comprise spring-loaded double escapement pawls each arranged so as normally to lock the associated totalizing element, and adapted to be operated to permit the said element to be driven for two half-step movements to effect the carry.

A counter may be provided for counting the number of records totalized by the machine. This counter may comprise a plurality of counting elements, and the counting element associated with the units denomination may be controlled by a double escapement pawl fixed to the armature controlling one of said totalizing elements so as to be advanced one step at a time irrespective of the numerical value being entered into the said totalizing element.

Means may be provided for transferring the contents of the totalizing elements and of the counting elements to a grandtotal mechanism.

A machine according to the invention may further comprise a plurality of printing sectors having type bars, each of said sectors being associated with a totalizing element, or with a counting element, respectively, means for adjusting the said sectors in accordance with the contents of the associated totalizing or counting elements, means for operating the type bars to produce an imprint of the registered information, a platen, a paper strip to be printed, an ink ribbon, and means for shifting the paper strip and the ink ribbon after each printing operation.

The machine may further comprise means for coupling the elements of the totalizing registers and of the counter to the corresponding elements of the grandtotal mechanism and to the corresponding printing sectors, and means for clearing the totalizing registers and the counter, whereby its contents are transferred to the said grandtotal mechanism and to the said printing sectors.

The means for varying the pattern of the beam of radiant energy impinging on the analysing cell may comprise a plurality of slides arranged to intercept the beam and means for adjusting the slides to vary the pattern of that part of the beam passing the slides to bring it into conformity with that of a desired identification marking.

The machine may further comprise a plurality of numeral wheels arranged to give a visual indication of the identification marking, these numeral wheels being set simultaneously with the slides.

The record feeding device may comprise at least two containers to contain the records to be fed through the machine, these containers being carried on a turntable, whereby records can be stacked in one container whilst records in the other container are being fed into the machine.

The invention may also provide a record sheet or the like carrying information represented by marked index areas arranged in denominational groups wherein one or more of said marked index areas in addition to representing information is positioned so as to constitute a control mark to co-operate with our analysing device to prevent the operation of a machine in the event of faulty feeding of the record through the machine. Further, the said index areas and said control mark may be printed in the sheet.

Figure 15:
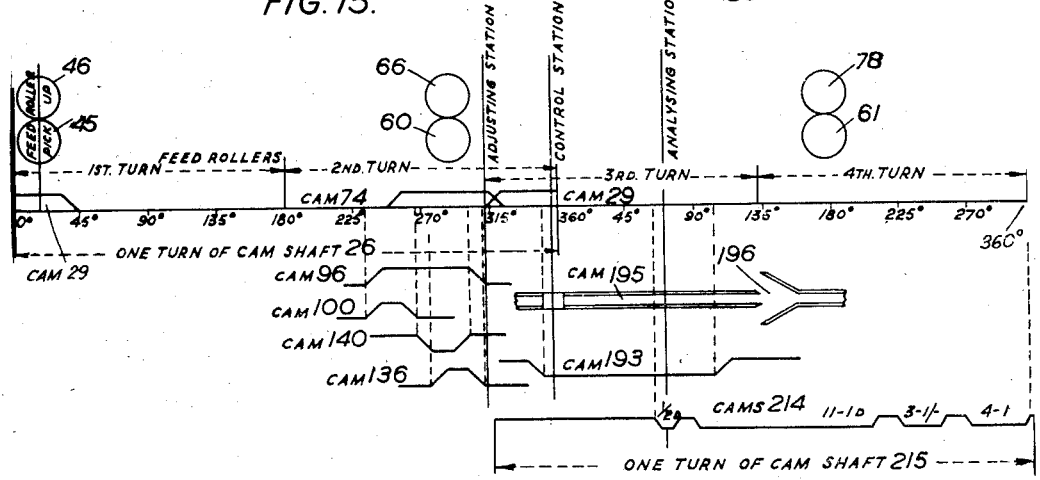
Figure 16:
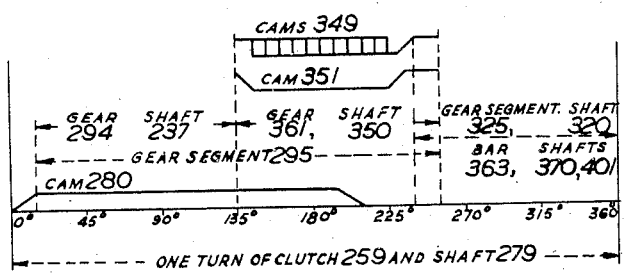
Figure 2A:
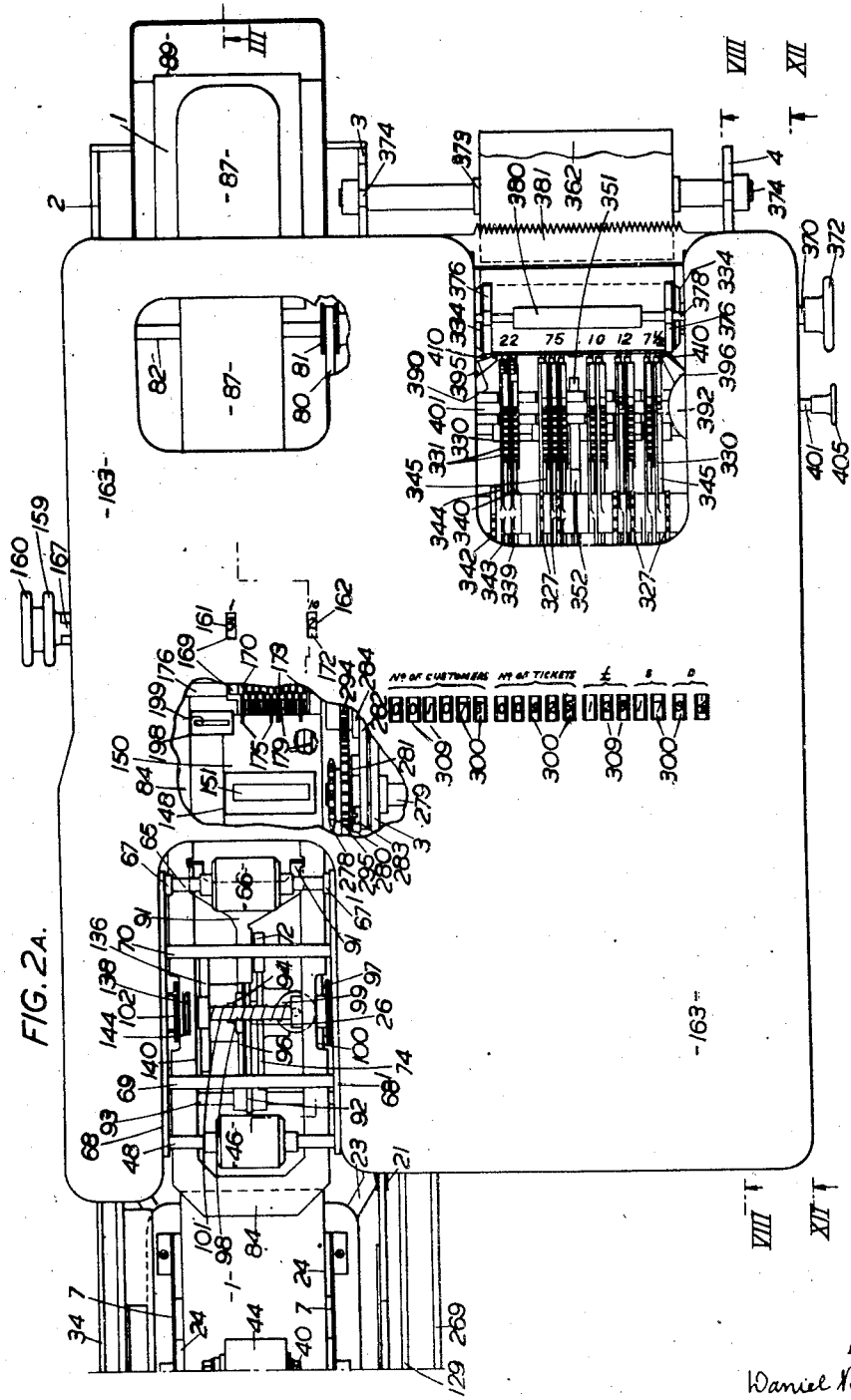
Figure 3A:
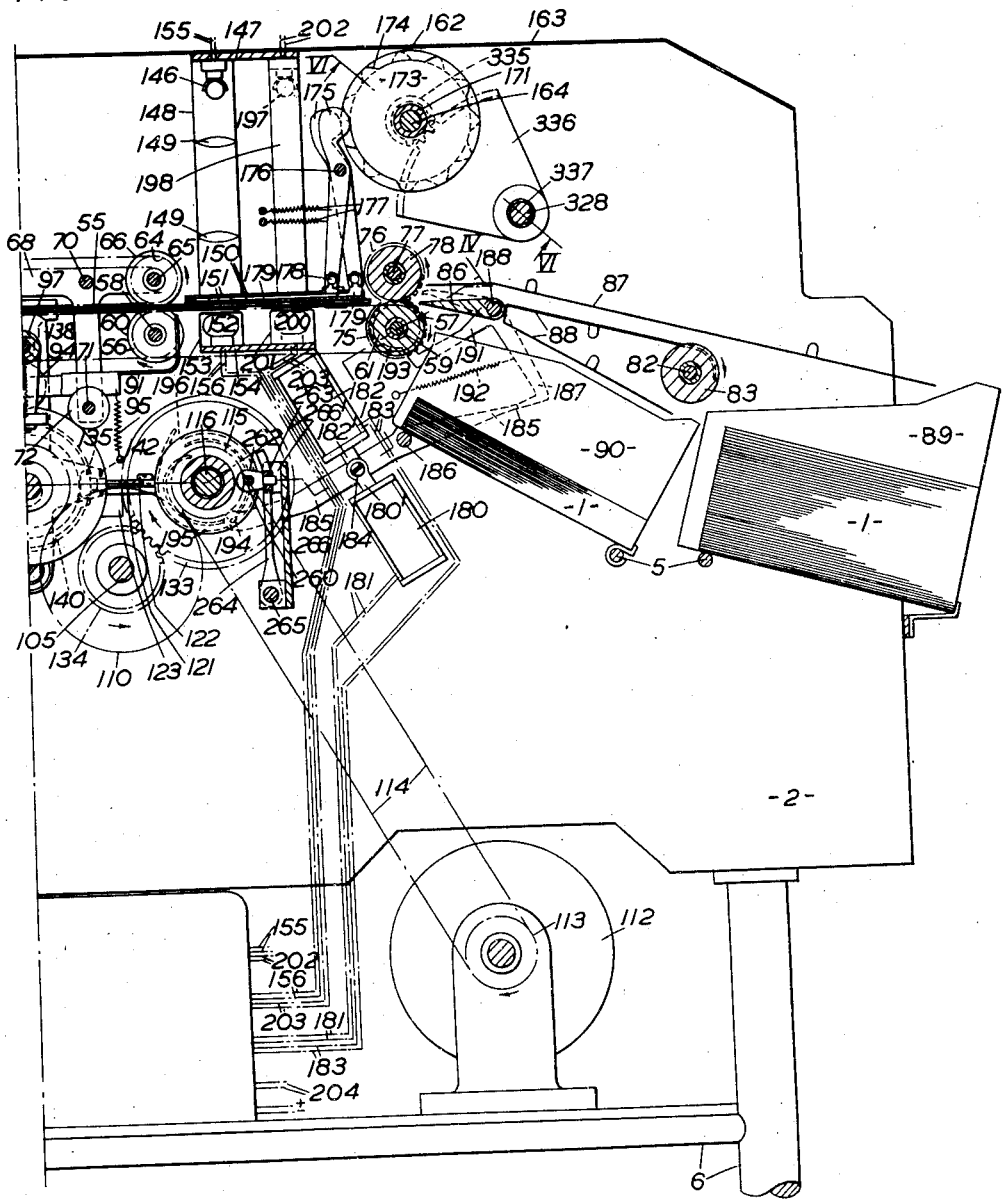
Figure 8:
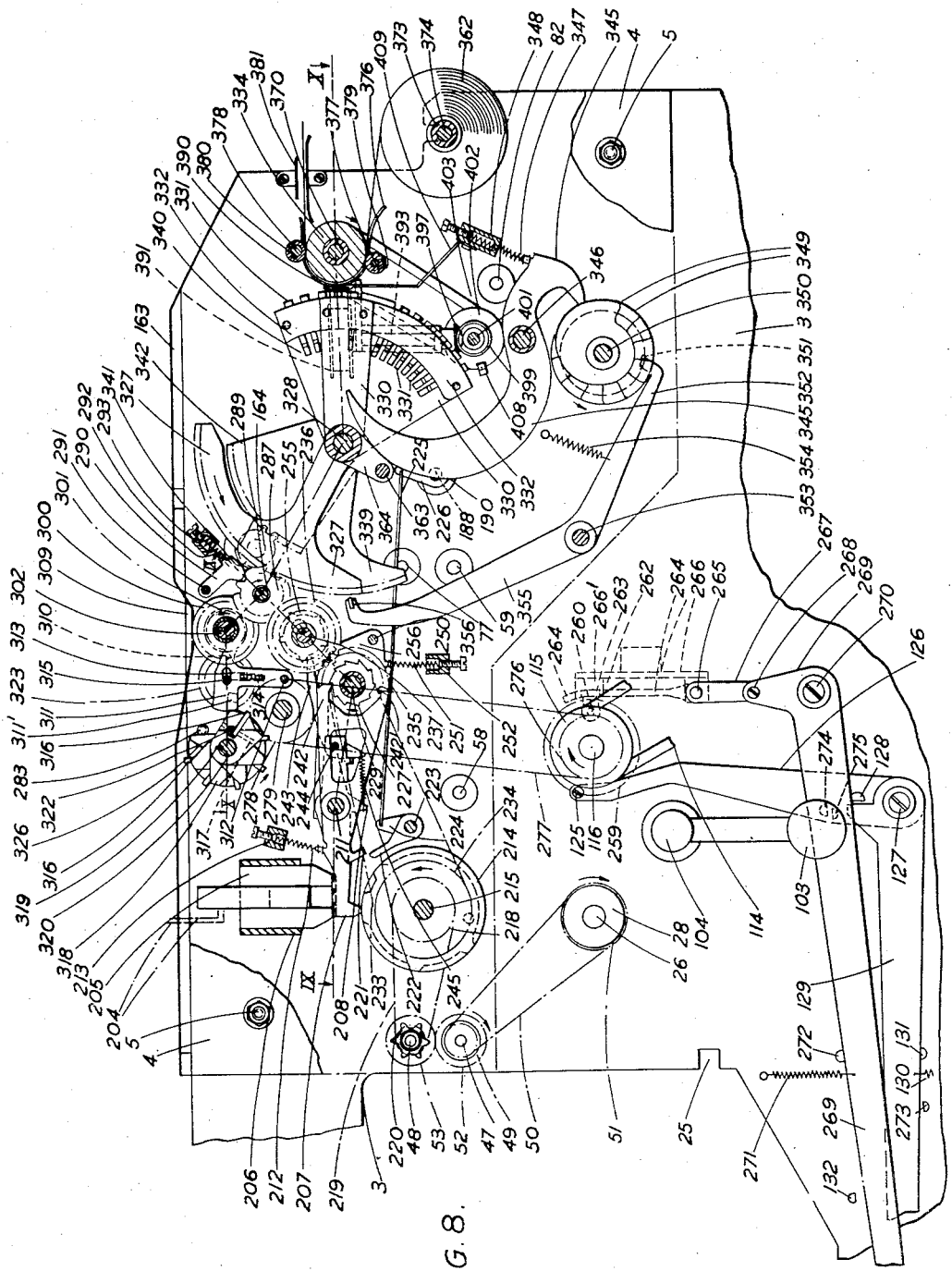
Figure 10:
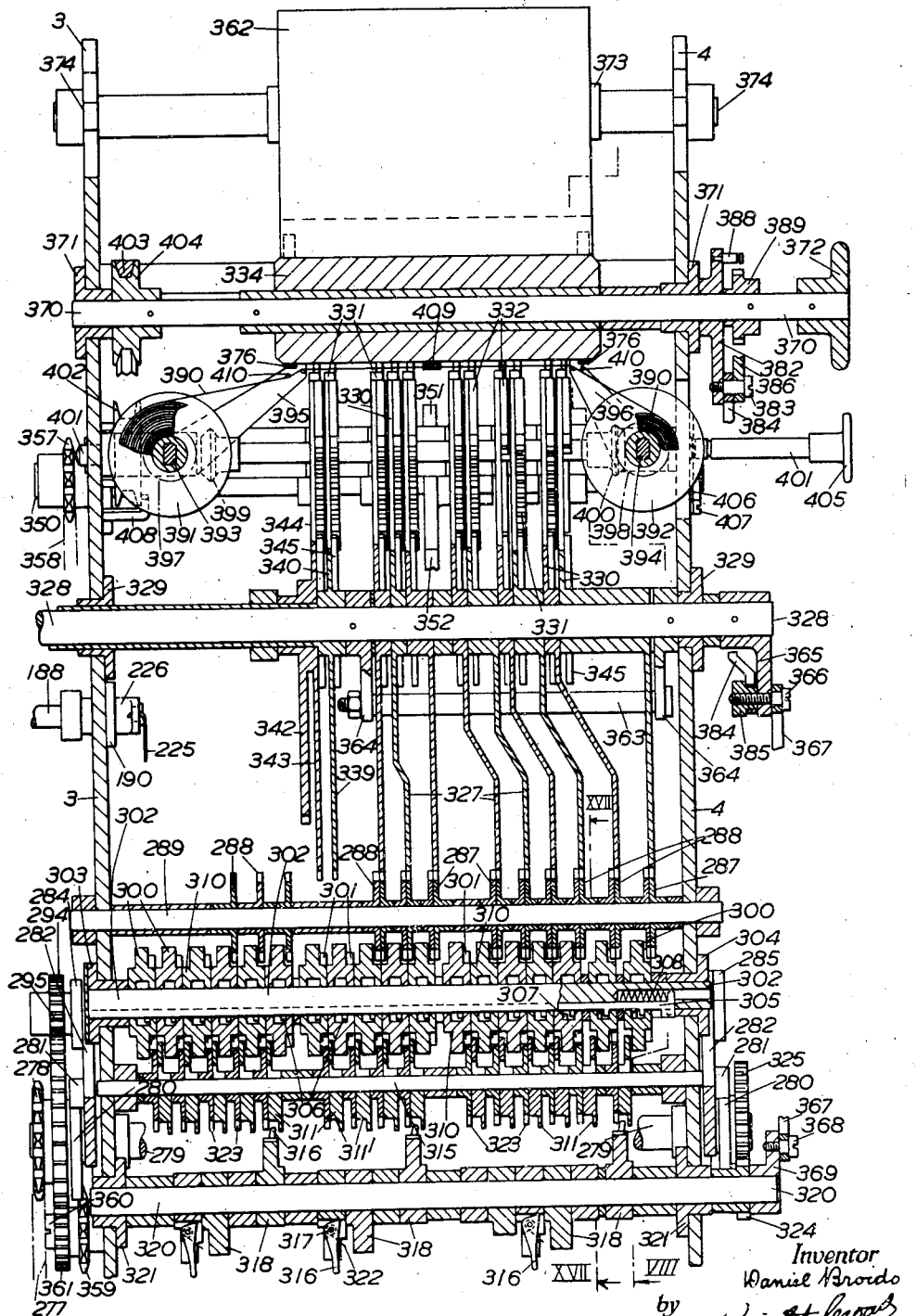
Figure 11:
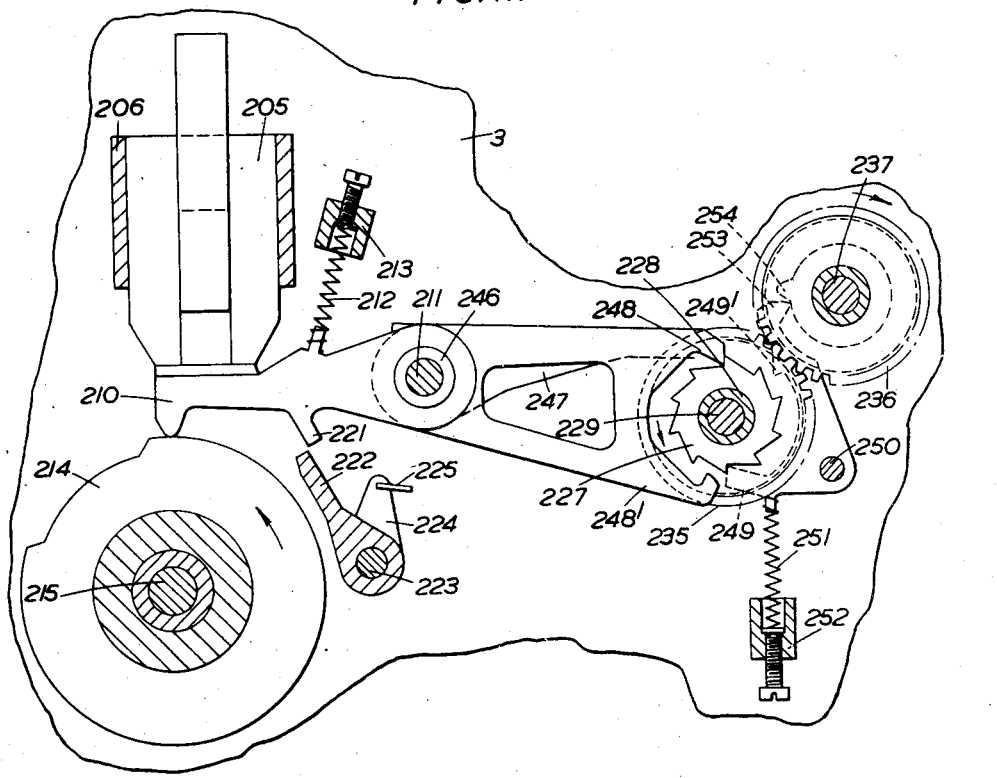
Figure 13:
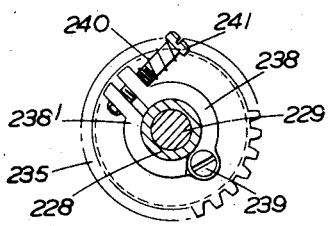
Figure 14:
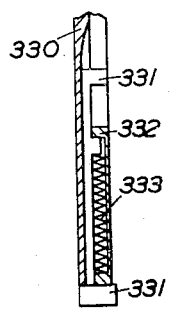
Figure 12A:
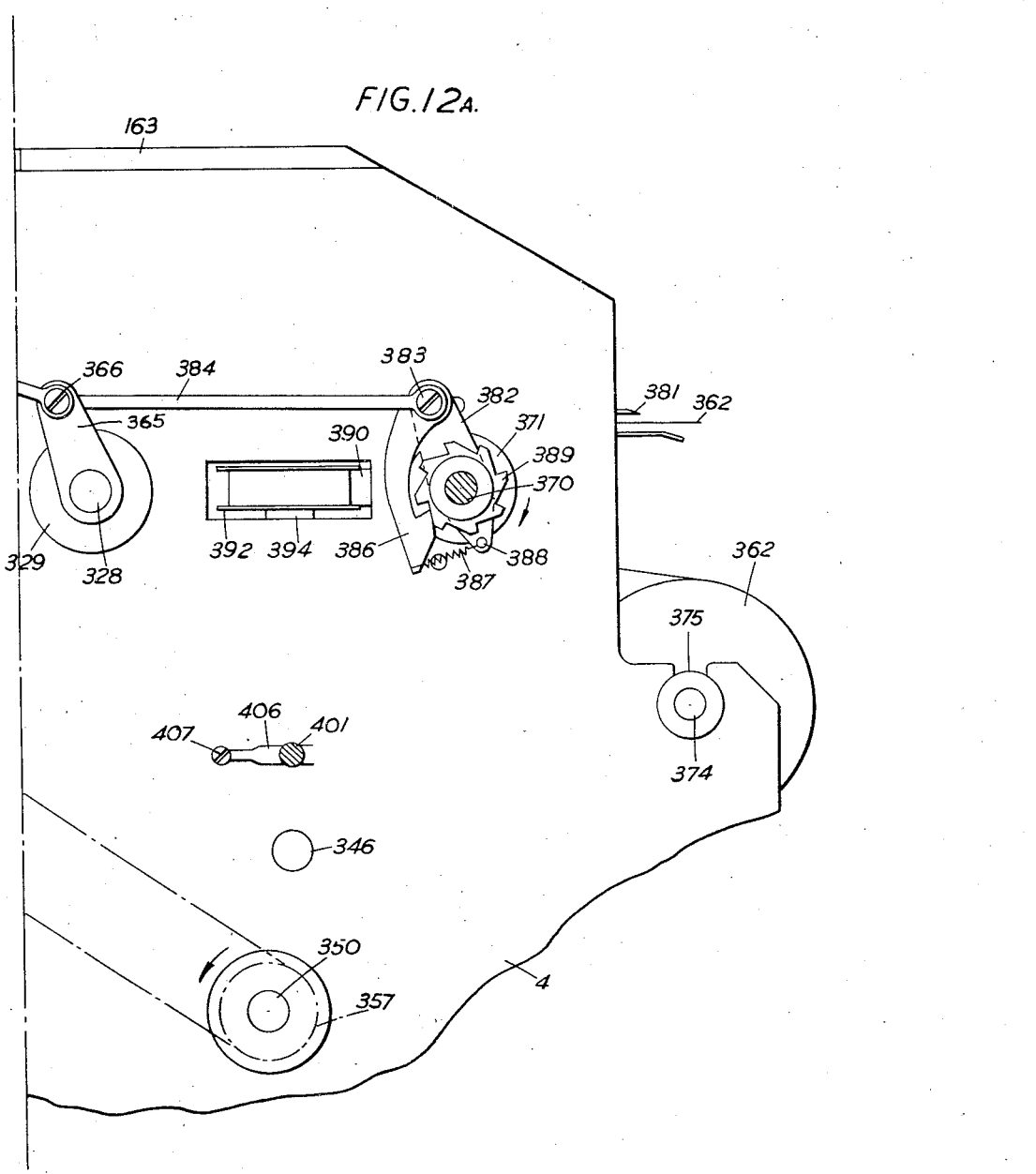

One way of carrying the invention into effect is illustrated in the accompanying drawings, wherein Figure 1 shows, by way of example, a record intended for use in a machine constructed according to the present invention, Figures 2 and 2A together are a plan view of a tabulating machine made according to the invention, Figures 3 and 3A together are a vertical section on line III—III of Figure 2, this section being also indicated in Figures 4 and 6, Figure 4 is a section on line IV—IV of Figure 3, Figure 5 shows a code arrangement on a record, Figure 6 is a section on line VI—VI of Figure 3, Figure 7 shows, in development, a cam arrangement for the selective set-up, Figure 8 is a vertical section on line VIII—VIII of Figure 2, Figure 9 is a section on line IX—IX of Figure 8, Figure 10 is a section on line X—X of Figure 8, Figure 11 is a partial section on the line XI—XI of Figure 9, Figures 12 and 12A together are a partial section on line XII—XII of Figure 2, Figure 13 shows the arrangement of a frictional drive unit, Figure 14 illustrates, on a larger scale, a type bar used in the machine, Figure 15 is a timing chart for paper feed and the analysing operation, Figure 16 is a timing chart for the printing operation, and Figure 17 is a partial section on line XVII—XVII of Figures 9 and 10.

The invention will now be described with reference to a preferred embodiment designed specifically for dealing with checks or tickets, such as are handed to customers in restaurants and tea-shops. Essentially the same arrangement could, however, be used for the automatic analysis and tabulating of other marked documents, for instance sale slips, time cards, pay slips, and the like.

It is assumed that the checks or tickets to be used in the machine hereafter described emanate from a chain of tea-shops and restaurants, all shops being controlled from a central office. In such cases it is desired to check up cash relative to each cashier, sales effected by each waitress and shop, total amount of cash, number of customers, and other information. For this purpose, according to the invention, each waitress and sales girl is given a booklet of tickets printed, in addition to the usual matter such as named of the firm, number or address of the shop, and so forth, with the individual number of the waitress, both in readable characters and in coded marks. In the example shown in Figure 1, the number of the waitress is 23, this figure is marked in area A in a code to be explained hereafter. A number of index areas B indicated "½d," "11d–1d," and "3/—1/–" are provided for pence and shillings, respectively, of the amount sold; further index areas B designated "4–2" are provided for the number of customers served. The waitress writes on the ticket 1 in area C the consumed items and the total in the usual way; in addition, for the purpose of the present invention, she has to make pencil or like opaque marks in corresponding index areas B; for instance, the total amount being 1/6; she makes marks in index areas "1–" and "6d." If two persons have been served, the waitress would mark the index area "2." If only one customer has been served, as in the assumed example, no pencil mark is required, the index area corresponding to "1" being pre-printed black on all tickets. In this way, the transparency of the relevant index areas B is made different from that of the unmarked areas.

When paying, the customer hands his ticket to the cashier who, on checking up the total, puts the ticket into a pigeon-hole reserved for the waitress. After a day's work, the tickets are bundled in the order of waitresses and sent to the central office to be checked up by means of a machine according to the present invention.

Generally speaking, the machine comprises two main parts, namely a paper feed and an analysing mechanism mounted between side frames 2, 3 (Figures 2 and 3), and a tabulating and printing mechanism disposed between side frames 3, 4 (Figures 2 and 8). The side frames 2, 3, 4 are interconnected by a number of tie-rods 5, and the whole is supported by a supporting structure 6.

*Paper feed*

As shown in Figures 2 and 3, the machine comprises two paper containers formed by side plates 7, 7 and 7', 7', and end plates 8 and 8', respectively, mounted on a common platform 9 rotatably mounted on a shaft 10 and supported by a collar 11 secured to the shaft, which is vertically slidable in bearings 12 formed on a plate 13 secured to two tie-rods 5; a weight 14 on a rope 15 slung over a pulley 16 and fixed as at 17 to the shaft 10 forces the platform 9 upwards, thus pressing the uppermost ticket 1 onto rollers 18 rotatable on fingers 19 carried on brackets 20 secured to side frames 2, 3 respectively. As the tickets 1 are fed into the machine, the platform 9 gradually rises, being guided by rollers 21, 22 rotatable on fingers 23 secured to the platform. Side plates 7, 7' are provided with rubber lining 24, and are set to hold the tickets 1 with a certain amount of pressure, so as to prevent double-feeding.

The tickets 1 are piled up in one of the containers, for instance 7, 8, in the same order as they arrive from the shops, the lots pertaining to individual waitresses being separated by distinctive cards made of strong board or thin metal plate. The other container 7', 8' can be filled while the machine is working. As soon as the first paper container 7, 8 is empty, the operator lowers the platform 9 until the rollers 21, 22 are aligned with a cut-out 25 formed in frames 2, 3, and turns it around the shaft 10, thus bringing the second container 7', 8' into the working position previously occupied by the first container 7, 8.

The paper feed is operated by a cam shaft 26 (Figures 3, 4) journalled in bearings 27, 28 in frames 2, 3, respectively. A cam 29 secured to shaft 26 co-acts with a roller or ball-race 30 carried on a lever 31 pivoted as at 32 in frame 2, a spring 33 maintaining the roller 30 in contact with cam 29. A connecting rod 34 is linked as at 35 to lever 31, and at the opposite end to a trunnion 36 carrying a roller 37 arranged to move in a rail 38 secured to frame 2. Linked to the other end of trunnion 36 is a rod 39 carrying a spindle 40 to which is fixed an axle 41 formed with shaped recesses for rollers 42. A rim 43 carrying a picker roller 44 of rubber or similar material is journalled on the axle 41. As the cam 29 rotates, lever 31, rods 34, 39, and picker 44 are reciprocated; when the picker 44 is moved to the left as viewed in Figure 3, it free-wheels on axle 41. When shifted to the right, the rim 43 is locked by the rollers 42, and the picker 44 cannot rotate; thus, it drags along the uppermost ticket 1, picks it up, and shifts it into a pair of feed rollers 45, 46 on shafts 47, 48, respectively, journalled in frames 2, 3.

Shaft 47 of the lower roller 45 carries a sprocket designated 49 in Figure 8, which is driven through a chain 50 by a sprocket 51 fast on cam shaft 26. Shaft 47 also carries a gear 52 meshing with a gear 53 fast on shaft 48 of the upper roller 46. Shaft 47 further carries another sprocket 54 (Figure 3) driving, through chain 55, sprockets 56, 57 secured to shafts 58, 59 journalled in frames 2, 3 and carrying rollers 60, 61, respectively, which form the lower components of two further pairs of feed rollers. Shaft 48 of the first upper roller 46 carries a sprocket 62 driving through a chain 63, a sprocket 64 fast on shaft 65 carrying the second upper roller 66. This shaft 65 is journalled in bearings 67, 67' (Figure 2) in plates 68, 68' pivoted on shaft 48 and interconnected by tie-rods 69, 70, 71 (Figure 3) to form a rigid frame. The lower tie-rod 71 carries a roller 72 maintained by a spring 73 in contact with a cam 74 rigid on cam shaft 26. As the cam 74 revolves, the upper feed roller 66 is momentarily lifted up clear of the lower roller 60, so that the ticket is free to be adjusted as will be presently described.

Shaft 59 of the lower feed roller 61 of the third pair carries a gear 75 meshing with a gear 76 on a shaft 77 journalled in frames 2, 3 and carrying the upper feed roller 78 of the third pair. Shaft 59 further carries a pulley 79, clearly shown in Figure 4 driving through a belt 80 (Figure 2) another pulley 81 fast on a shaft 82 journalled in frames 2, 3 and carrying a single feed roller 83 (Figure 3).

While being fed between the pairs of feed rollers, the tickets pass through a channel formed by guides 84, 85 secured to frames 2, 3. After passing the last pair of rollers 78, 81, the tickets are conducted, as will be described hereafter, by a flap 86 either into a channel formed by guides 87, 88 and hence into a bin 89 reserved for "correct" tickets, or underneath the guide 88 into a bin 90 reserved for "wrong" tickets. Bins 89, 90 are supported by tie-rods 5, and can be readily removed in order to be emptied.

After a ticket I has passed the first pair of feed rollers 45, 46, it is adjusted to ensure correct alignment with control and analysing devices to be described hereafter. Front adjustment is effected by stop fingers 91 fixed to a plate 92 pivoted on a cross-bar 93 secured to frames 2, 3. A roller 94 journalled in plate 92 is biased by a spring 95 onto a cam 96 fast on cam shaft 26. Fingers 91 are interposed by cam 96 in the path of the ticket just before the upper feed roller 66 is lifted up as described, so that the ticket runs up against the stop fingers, and, being in the meantime released by the roller 66, adjusts itself accordingly, whereupon the roller 66 is again lowered and maintains the ticket in its correct position.

Side adjustment is effected, simultaneously with the front adjustment, by a jogger 97 (Figures 2 and 3) slidable on a cross-bar 98 supported in the frames 2, 3. A downward extension of jogger 97 carries a roller 99 biased against a face cam 100 (Figure 4) by a pressure spring 101 (Figure 2) anchored on cross-bar 98. When shifted by the lobe of cam 100 along the cross-bar 98, the jogger 97 shifts the ticket onto a stationary jogger 102 fixed to cross-bar 98, thus adjusting it sideways. The co-ordination of the various elements of the paper feed is diagrammatically illustrated in the timing chart shown in Figure 15.

The paper feed can be operated manually by means of a handle 103 (Figures 4, 8) rotatably secured to a downward extension of a sleeve 104 slidable on a shaft 105 and normally maintained in an inoperative position (shown in Figure 4) by two balls 106 inserted into a bore in the shaft 105 and pressed into locating holes in sleeve 104 by a spring 107. When the sleeve is pressed inwards, a recess 108 engages a pin 109 fixed to shaft 105, which can then be rotated by turning the handle 103. Fast on shaft 105 is a gear 110 meshing with a gear 111 secured to cam shaft 26.

Normally, the machine is driven by a motor 112 (Figure 3) mounted in the supporting structure 6; the motor pulley 113 drives, through a belt 114, a pulley 115 fast on a clutch shaft 116 journalled in bearings 117, 118 (Figure 4) in frames 2, 3. Slidably mounted on a key 119 in shaft 116 is a clutch 120 operable by a clutch fork 121 pivoted as at 122 in a bracket 123 secured to the frame 2; a spring 124 tends to swing the clutch fork 121 into an inoperative position. An extension of the clutch fork 121 carries a bolt 125 which protrudes through a slot in the frame 3 and links the fork 121 to a bail 126 (best shown in Figure 8) pivoted as at 127 in frame 3 and carrying an abutment 128 co-acting with a feed lever 129 mounted adjacent hereto on pivot 127. Feed lever 129 is normally biased by a spring 130 onto a stop 131; when lifted up to a stop 132, it abuts against the abutment 128 and swings the bail 126 clockwise as viewed in Figure 8, thus swinging the clutch fork 121 anti-clockwise in the horizontal plane into position shown in Figure 4, and causing the clutch 120 to engage a co-acting clutch member formed on a gear 133 rotatably mounted on clutch shaft 116. Gear 133 is in mesh with a gear 134 fast on handle shaft 105. When being driven by the clutch 120, the gear 133 thus drives the cam shaft 26 through gears 110, 111.

If for any reason the flow of tickets is interrupted, the machine is automatically stopped by the following cut-out device. A forward extension of clutch fork 121 carries a roller 135 (Figure 4) coacting with a face cam 136 fast on cam shaft 26. This extension further carries a finger 137 co-acting with a slide 138 mounted for vertical movement on shaft 26 and cross-bar 98. A downward extension of slide 138 carries a roller 139 (Figure 3) co-acting with a cam 140 integral with cam 136. When a recess in cam 140 is aligned with roller 139, a spring 141 anchored on cross-bar 98 forces the slide 138 upwards, and its upper end is caused to press gently against the ticket I which at this moment is in the adjusting position. The spring pressure is of course insufficient to damage the ticket, which is sufficiently strong to prevent a further movement of slide 138. In this position, an extension 142 (Figure 4) on slide 138 locks the finger 137, being supported by an abutment 143 on bracket 123; thus, the clutch 120 remains in engagement with gear 133, which, consequently, continues to drive the paper feed. However, if there is no ticket in the adjusting position when the roller 139 is allowed to rise by its cam 140, the slide 138 will be lifted by its spring 141 through a slot 144 (Figure 2) provided in guides 84, 85, the extension 142 will de-latch the finger 137, and the clutch 120 will be disengaged by its spring 124, thus interrupting the paper feed.

This cut-out can be initiated either manually whenever it is desired to stop the paper feed by preventing the picker 44 from feeding the uppermost ticket, or automatically by means of above-mentioned cards separating the individual lots of tickets. These cards have sideways extensions 145 (Figure 2) abutting against side plates 7 of the paper container; thus, whenever a card is reached, it will not be fed into the machine, and the paper feed will be stopped as heretofore described, so that the operator has an opportunity to take the necessary readings as will be explained hereafter.

*Selective control device*

After passing the second pair of feed rollers 60, 66, the tickets I reach a control device comprising a lamp 146 (Figure 3) mounted on a plate 147 secured to frames 2, 3, a casing 148 with lenses 149 adapted to concentrate the beam of light onto a frame 150 having an aperture 151, and a light-sensitive cell 152 mounted in casing 153 on a plate 154 secured to frames 2, 3. Lamp 146 and cell 152 are connected by wires 155, 156, respectively, to an amplifier device 157 mounted in the supporting structure 6. The amplifier device 157 may be of any suitable type; it comprises a supply of current, amplifier and rectifier tubes, transformers, and other necessary electrical components.

The selective control device comprises a control device adapted to segregate badly fed and spoilt tickets, and a selective device adapted to select for operation only tickets bearing certain distinctive markings.

The selective control device according to the present embodiment is adapted to co-operate with distinctive marks 158 arranged on the tickets 1 in areas A, Figure 1. As already mentioned, these marks represent, in the present example, the number of waitress; they are arranged in a manner shown in Figure 5. The whole of the area A is divided into two sub-areas, one for the tens and the other for the units of the waitress' number; each sub-area is subdivided into five imaginary rectangles 152 identified by digits 1-5. Each digit of the waitress' number is represented according to the following code:

| Digit | Rectangle |
|---|---|
| 0 | 1, 2 |
| 1 | 1, 3 |
| 2 | 1, 4 |
| 3 | 1, 5 |
| 4 | 2, 3 |
| 5 | 2, 4 |
| 6 | 2, 5 |
| 7 | 3, 4 |
| 8 | 3, 5 |
| 9 | 4, 5 |

Thus, in the present case, the value "2" of the tens denomination, i. e. 20 is represented by rectangles 1 and 4 in the tens sub-area, and "3" is represented by rectangles 1 and 5 in the units sub-area, as indicated by crosses in Figure 5. When the tickets are printed, the relevant rectangles are left blank, the remainder of the area A being overprinted, as shown in Figure 1.

Although the tickets may have been, and usually are, manually pre-sorted into lots pertaining to individual waitresses, they have to be checked up, and the selective arrangement about to be described is designed to serve this purpose.

Before starting the machine, the operator sets up the number allocated to a particular waitress, i. e. that waitress by whom the uppermost lot of tickets should have been issued, by turning two knobs 159, 160 (Figures 2 and 6) until the required numerals appear in appertures 161 (for units) and 162 (for tens) made in the machine cover 163. Knob 159 is rotatably mounted on a shaft 164 journalled in bearings 165, 166 in frames 2, 3; it has two fingers 167 which fit into two recesses in a sleeve 168 carrying a rim 169 marked with numerals O—X and also a set of five cams 170 corresponding to five rectangles 1—5 of the units sub-area on a ticket. Knob 160 is fixed to shaft 164 to which is secured a sleeve 171 carrying a rim 172 and a set of five cams 173 identical with rim 169 and cams 170, respectively, but reserved for the tens sub-area; it may be pointed out that the tickets are fed through the machine in the direction of the arrow in Figure 1. Cams 170, 173 each have a number of lobes 174 (Figure 3), one complete set being shown in development in Figure 7. When a numeral on rim 169 or 172 is aligned with aperture 161 or 162, respectively, the corresponding lobes 174 are brought into an operative position, and it will be noted that the cam arrangement corresponds to the code table.

Each of the cams 170, 173 co-operates with a rocker 175 (Figures 3 and 2) mounted on a cross-bar 176 supported in frames 2, 3. Rockers 175 are biased by springs 177 onto cams 170, 173. The lower extensions of the rockers 175 are each linked as at 178 to a slide 179. The slides 179 are mounted in edge-to-edge contact in frame 150 and extend, when in inoperative position, across the aperture 151, thus cutting off a corresponding portion of the beam of light emanating from the control lamp 146; however, when a rocker 175 is swung against the tension of its spring 177 by a lobe on the respective cam 170 or 173, the associated slide 179 is shifted to the right as viewed in Figure 3, and its end uncovers the aperture 151 to allow free passage of light in the corresponding position. Slides 179 are positioned transversely exactly in line with marks 158 on the tickets 1, and it will be seen that if the knobs 159, 160 are set according to a certain number, say "23," the slides 179 which will be thus shifted will allow the light beam to illuminate marks 158 representing "23" on the ticket, the remaining slides 179 keeping the remaining portion of the area A dark. If the rims 169, 172 are set in the position "XX" (see Figure 7), all slides 179 will be set open, and no selective operation will take place.

The amplified impulse of the control cell 152 is arranged to energise a solenoid electromagnet 180 (Figure 3) secured to frame 2 and connected by wires 181 to the amplifier device 157. Oppositely disposed to magnet 180 is another electromagnet 182 permanently energised from the source of power through wires 183. The cores 180', 182' of the magnets 180, 182 are linked as at 184 to a lever 185 rockably mounted on a cross-bar 186 supporting the bin 90. One end of lever 185 co-acts with an arm 187 fixed to a shaft 188 (see also Figure 4) journalled in bearings 189, 190 in frames 2, 3; secured to this shaft 188 is a sorting flap 86. Integral with arm 187 is an arm 191 biased by a spring 192 onto a cam 193 secured to shaft 59 of the lower roller 61 of the third pair of feed rollers. A rearward extension of lever 185 carries a pilot 194 co-operating with an internal cam 195 fast on clutch shaft 116. Normally, the flap 86 is maintained by arm 191 and cam 193 in the lower position (shown in full lines in Figure 3), and the pilot 194 is guided in the channel formed in cam 195. In this position of flap 86, the tickets are guided over the top of the flap into the bin 89. However, at the exact moment when the distinctive marks 158 on a ticket reach the control station, viz., the aperture 151, a cut-out in cam 195 and a recess in cam 193 render lever 185 and flap 86, respectively, free for operation; at this moment, the flap 86 is supported solely by the lever 185 latching the arm 187. The amplification of the control cell 152 is such that, if it is exposed to the full amount of light passing through four marks 158 on the ticket, the energisation of the control magnet 180 is exactly equal to that of the permanently excited magnet 182; consequently, if the set-up of slides 179 corresponds to the marks 158 on the particular ticket that happens to be in the control position, the lever 185 will receive an equal pull from both magnets 180, 182, and will thus remain stationary, thus continuing to latch the flap 86 in the lower position; the ticket will travel into the bin 89 reserved for "correct" records. However, if the set-up of the selector slides 179 does not correspond to the marks 158 on the ticket, the control cell 152 will receive only a reduced amount of light, or no light at all; consequently, the energisation of the control magnet 180 will be reduced, its pull will be weaker than that of the permanently energized electromagnet 182, which will swing the lever 185 clockwise, thus causing it to de-latch the arm 187; thus, the flap 86 will be rocked by the spring 192 into an elevated position (shown in dotted lines in Figure 3); consequently, the ticket will travel underneath the flap 86 into the bin 90 reserved for "wrong" tickets. Arm 191 and flap 86 are restored by cam 193; pilot 194 and lever 185 are restored by cam 195 which has a suitably shaped mouth 196. The timing of these cams with the cam shaft 26 is shown in the chart of Figure 15.

It is evident that this separation of "wrong" tickets will take place whenever the control cell 152 is not fully illuminated. This will happen if the marks 158 on a ticket do not correspond to the selective set-up of the control device as explained above, or in the case of double feeding, or if the area A on a ticket has not been properly aligned with the control aperture 151 when the cams 193, 195 release their associated parts 191, 194. This incorrect alignment may be due to a failure of the paper feed mechanism, or to bad printing resulting in inaccurate positioning of marks 158 on the ticket, or to a damage sustained by the ticket from rough handling and the like. All such badly fed, or badly printed, or damaged tickets will be eliminated, and it is evident that the photocell 152 fulfils a double function, namely that of selecting tickets having predetermined distinctive marks 158, and that of ensuring proper alignment of tickets in an analysing station to be described hereafter.

The control aperture 151 extends transversely somewhat beyond the area A, the small additional quantity of light which would penetrate through this extension being normally intercepted by the black strip on the left of index areas B (Figure 1). If a blank sheet happens to be among the tickets, this small quantity of light will be added to the amount of light passing through the four open slides 179, and consequently the energisation of magnet 180 will exceed that of the permanently energized electro-magnet 182 and will attract the lever 185; thus, the flap 86 will be de-latched and operated as described above, and the blank sheet will be deposited in the bin 90 reserved for "wrong" tickets.

*Analysing and tabulating device*

After the distinctive marks 158 have passed through the control station, the first index area B, namely that reserved for ½d, reaches an analysing station. The analysing device (Figure 3) comprises a lamp 197 mounted in plate 147 in a casing 198 which may contain lenses similar to lenses 149 of the control device, an aperture 199 (Figure 2A) in guides 84, 85, and a light-sensitive cell 200 mounted on plate 154 in a casing 201 which, of course, has an aperture similar to aperture 199. Lamp 197 and cell 200 are connected to the current supply and amplifier device 157 by wires 202, 203, respectively. It may be pointed out that the amplifier device 157 designates generally the assembly of various electrical components required for the proper operation of the machine: it comprises amplifier tubes controlled by the photocell 152, and other amplifier tubes controlled by the photocell 200. Both amplifying circuits are independent from each other, but they may comprise common elements, such as transformers, switches, and the like. The arrangement of amplifier circuits is well known and does not require a detailed description. The amplified impulse of the analysing cell 200 is arranged to control, through wires 204, an electromagnet 205 (Figure 8) mounted in a bracket 206 secured to the frame plate 4. Magnet 205 co-operates with four armatures 207, 208, 209, 210 (Figure 9) rockably mounted on a stationary shaft 211 supported in frames 3, 4. Each of the armatures 207—210 is biased by a pressure spring 212 (Figures 8, 11, 17) anchored in a bar 213 onto one of four cams 214 fast on a shaft 215 journaled in bearings 216, 217 (Figure 9) in frames 3, 4, and driven by a sprocket 218 connected by a chain 219 to a sprocket 220 (Figure 8) fast on shaft 48 of the first upper feed roller 46. Armature 207 is reserved for half-pennies, armature 208 for pence, armature 209 for shillings, and armature 210 for the number of customers. Each armature is normally locked by its associated cam 214, and is unlocked for operation by magnet 205 at the exact moment when the first index area B of the group associated therewith reaches the analysing station. Magnet 205 remains energised and attracts the armatures as long as the analysing cell 200 is illuminated, i. e., as long as the index areas B passing through the analysing station are blank; as soon as a marked, viz., black, index area B intercepts the light emanated by the lamp 197, the magnet 205 is de-energised and releases the armatures; however, only one of the armatures can swing out under the influence of its spring 212 at any one time, namely that armature associated with this particular group of index areas, as the remaining armatures are locked by their cams 214 although the magnet 205 is re-energised immediately after the passage of the black mark, it is not strong enough to restore the armature which has been released; this armature is restored by its cam 214 after the last index area of the respective group has passed the analysing station. Since each of the four groups comprise a different number of index areas, the cams 214 each have a recess of different length positioned as shown in Figure 8 and the timing chart of Figure 15. This arrangement will be more fully explained hereafter. After the last of the index areas B has passed through the analysing station, the appropriate cam 214 restores the armature 210, and the device is ready for the next analysing operation.

Each of the armatures 207—210 is formed with a finger 221 co-acting with a bail 222 fast on a shaft 223 journalled in frames 3, 4. Fast on shaft 223 is a crank 224 connected by a rod 225 to a crank 226 fast on shaft 188 of the flap 86. The armatures are free to operate as long as the flap 86 remains in the normal i. e., lower position; however, when the flap 86 is operated by the control device as heretofore described, rod 225 causes bail 222 to swing upwards into line with fingers 221, thus locking the armatures 207—210. In this manner, it is ensured that the analysing device is operated only by correctly fed and printed tickets bearing the set-up number.

Armatures 207—210 co-operate with some of a plurality of ratchet wheels 227 rotatably mounted on a common sleeve 228 secured to a shaft 229 journalled in bearings 230, 231 (Figure 9) in frames 3, 4; a sprocket 232 fast on shaft 229 is driven, through a chain 233, by a sprocket 234 fast on cam shaft 215. Each ratchet 227 carries a gear 235 meshing with a gear 236 rotatable on a shaft 237 (hereafter referred to as subtotal shaft). Each gear 235 carries a frictional drive unit (best shown in Figure 13) comprising two frictional shoes 238, 238' pivoted as at 239 in gear 235 and pressed together by a spring 240 adjustable by a screw 241. These frictional drive units tend to rotate the gears 235 with the shaft 229, but they are normally locked by armatures 207—210 or by carry pawls to be described hereafter.

Considering first the halfpenny transmission, the armature 207 is extended to form a double pawl 242, 242' co-acting with the first (on the right in Figure 9) ratchet wheel 227. This double pawl 242, 242' of armature 207 is similar to the double pawl 248, 248' associated with armature 210 and clearly shown in Figure 11. As shown in Figure 8, the tooth 242 (corresponding to tooth 248 in Figure 11) of the double pawl normally locks the ratchett 227 and prevents it from being driven by its frictional drive unit. When the armature 207 is momentarily released by the associated cam 214 and magnet 205, and swings out under the influence of its spring 212, the upper tooth 242 (corresponding to tooth 248 in Figure 11) releases the ratchet 227, which is immediately turned by its frictional drive for approximately half a tooth, whereupon it is engaged by the lower tooth 242' (corresponding to tooth 248' in Figure 11). When the associated cam 214 restores the armature 207, the tooth 242' (corresponding to tooth 248' in Figure 11) again releases the ratchet 227 and permits it to move again approximately half a tooth, whereupon it is re-engaged by the upper tooth 242 (corresponding to tooth 248 in Figure 11). Thus, the ratchet wheel 227 is rotated through a distance equal to one tooth, and in this manner the occurrence of a black mark in the index area "½d" on a ticket is registered by a one-step movement of the respective sub-total gear 236.

The pence armature 208 (Figure 17) and the shillings armature 209 each carry a trigger 243 pivoted as at 244 and biased by a spring 245 into engagement with the associated ratchet wheel 227. The cams 214 controlling these two armatures are shaped respectively to allow for an eleven-step movement (for 1–11 pence) and a three-step movement (for 1–3 shillings) of the respective ratchet wheel 227. The index areas associated with the highest denominational values, viz., "11d's" and "3/–," respectively, pass through the analysing station first; consequently, if the black mark is in the "11d's" area, the ratchet 227 is free to complete an eleven-step movement, but if the mark is, for example, in the "6d's" area, the ratchet will make only a six-step movement, whereupon the cam 214 will restore the armature 208, and the trigger 243 will re-engage the ratchet 227. Similarly, if the black mark is in the "3/–" area, the ratchet wheel 227 controlled by the armature 209 will be released to complete a three-step movement before it is re-engaged by the trigger 243, but if the mark is in the "1/–" area, the ratchet 227 will complete only a one-step movement before it is re-engaged and stopped, and so forth.

The three gears 236 operable by armatures 207—209 form part of a subtotal amounts totalizing register comprising six gears 236 (shown in Figure 9 adjacent to the right-hand frame 4), the remaining three gears 236 of this totalizing register being driven by carry devices to be described hereafter.

The fourth armature 210, best shown in Figure 11, is fixed to a sleeve 246 carrying a single pawl 247 co-acting with a ratchet wheel 227 meshed to a gear 236 forming part of a subtotal "Number of customers" totalizing register, which comprises a group of three gears 236 seen in Figure 9 next to the left-hand frame 3. The cam 214 co-operating with the armature 210 is shaped to allow for a four-step movement of the ratchet 227 associated with the single pawl 247; the operation of this ratchet wheel 227 is otherwise identical with those controlled by armatures 208, 209.

Secured to sleeve 246 is a double pawl 248, 248' which is similar to the halfpenny double pawl 242, 242'. Whenever the armature 210 is released by magnet 205, the upper tooth 248 releases the associated ratchet 227 which is then frictionally driven for half a tooth; when the armature 210 is restored by its cam 214, the lower tooth 248' again releases the ratchet 227 which is driven for another half a tooth. Thus, the total movement of this ratchet wheel is always one step, irrespective of whether the "Number of customers" ratchet controlled by the single pawl 247 is driven one or more steps. The ratchet wheel 227 controlled by the double pawl 248, 248' is meshed to a gear 236 forming part of a "Number of tickets" subtotal counter, seen in Figure 9 in the middle of subtotal shaft 237. Thus, the armature 210 serves a double purpose, namely it totalizes the number of customers, and also counts the number of tickets.

It is evident that the cams 214 must rotate in exact synchronism with the paper feed; their timing is shown in Figure 15.

It may be pointed out that all ratchet wheels 227 have ten teeth, and that the ratio of gears 235, 236 is 1:1 throughout, except for the pence transmission controlled by the armature 208, wherein this gear ratio is 10:12; consequently, each step of a ratchet 227 results in a $\frac{1}{10}$ turn of the associated subtotal gear 236, except in the case of pence transmission, where this resulting movement is $\frac{1}{12}$, corresponding to 0–11 pence.

*Subtotal carry device*

All ratchet wheels 227, except those controlled by the armatures 207—210, serve for carrying purposes. As indicated in Figures 11 and 9, each of these carry ratchets 227 is controlled by a double pawl 249, 249' pivoted on a bar 250 and biased by a spring 251 anchored in a bar 252 secured in frames 3, 4. Extensions 253 on double pawls 249 249' co-act with one-tooth pinions 254 fast on gears 236 of the next lower denomination. Just before a gear 236 completes a revolution, the associated one-tooth pinion 254 engages the extension 253 of the next higher double pawl 249, 249', and rocks the tooth 249 out of engagement with the associated ratchet 227, which is then shifted half a tooth by its frictional drive, whereupon it is arrested by the other tooth 249' of the double pawl. After the one-tooth pinion 254 has passed the extension 253, the spring 251 restores the double pawl; the tooth 249' again releases the ratchet 227 which is driven for another half a tooth, whereupon it is re-engaged by the first tooth 249 of the double pawl, thus completing the one-step carry movement. The "tens of shillings" carry device differs from this arrangement in that the one-tooth pinon 254 is replaced by a five-tooth pinion 255 (Figures 17, 8 and 9), so that the carry to the "units of pounds" gear 236 is effected after every two steps of the "tens of shillings" gear 236.

The halfpenny subtotal gear 236 has two five-tooth pinions, namely, 255 co-acting with a single carry pawl 256 (Figure 17), which is mounted on bar 250 similarly to double pawls 249 and co-operates with the pence ratchet 227, and another five-tooth pinion 255' (Figure 9) co-acting with the trigger 243 of the pence armature 262. When carrying, the pinion 255 first rocks the single pawl 256 into the path of the next tooth on the pence ratchet 227, whereupon the pinion 255' lifts the trigger 243 and thus releases the ratchet 227, which is shifted by its frictional drive half a tooth and is then arrested by the pawl 256. Pinion 255' then releases the trigger 243 which is restored by its spring 245, whereupon pinion 255 releases the pawl 256; on completion of a further half a step, the ratchet 227 is re-engaged by the trigger 243, thus completing the carry operation.

The carry device for the pence subtotal gear 236 (second from the right in Figure 9) is similar to that of the halfpenny transmission, the only difference being that instead of the five-tooth pinions 255, 255', this gear has two one-tooth pinions 254, 254', which co-operate with pawl 256 and trigger 243 of the shillings ratchet wheel 227 in the same manner as just described with reference to pinions 255, 255' and pence wheel 227.

In this manner, the amount and the number of customers are added up and accumulated for each waitress in the respective totalizing registers, whilst the number of tickets issued by each waitress is counted in the tickets counter. When a lot of tickets issued by a waitress has been run through, the paper feed is stopped by the card 145 separating it from the next lot, as heretofore described, and the operator actuates a clearing mechanism now to be described.

*Subtotal clearing device*

The subtotal totalizing registers and counter are cleared, and the accumulated amounts and numbers are transferred to grandtotal totalizing registers and counter and to a printing mechanism automatically by operating a clutch (Figures 3, 4, 8).

A disc 257 (Figure 4) carrying a driver pin 258 is rigidly mounted on the clutch shaft 116. A one-revolution clutch 259 rotatable on shaft 116 has a plunger 260 biased by a spring 261. Fast on plunger 260 is a trunnion 262 carrying a roller 263 co-operating with a sloped lever 264 fast on a shaft 265 journalled in frame 3 and bracket 266 fixed hereto. Lever 264 abuts against an extension 266' of bracket 266 and normally holds the plunger 260 out of the path of driver 258. Fixed to shaft 265 is a crank 267 linked as at 268 (Figure 8) to a print lever 269 pivoted as at 270 in frame 3 and biased by a spring 271 on to a stop 272. By momentarily depressing the print lever 269 on to a stop 273, the lever 264 is rocked away from the clutch 259, so as to release the roller 263; spring 261 then shifts the plunger 260 into the path of the constantly rotating driver 258, which picks it up and turns the clutch 259. Before a revolution of clutch 259 is completed, lever 264 is restored by spring 271; on reaching lever 264, roller 263 runs along its sloped face, thus withdrawing plunger 260 and disengaging it from driver 258. On completion of one revolution of clutch 259, roller 263 is arrested by a suitable abutment on lever 264. A stop 274 on print lever 269 coacting with a stop 275 on bail 126 of the paper feed drive prevents an operation of the clutch 259 while the paper feed is working.

Fast on clutch 259 is a sprocket 276 driving, through a chain 277, a sprocket 278 (Figures 8 and 10) fast on a shaft 279 journalled in frames 3, 4. This shaft 279 carries at either end a cam 280 (best shown in Figure 12) co-acting with a roller 281 on a bail 282 pivoted as at 283 in frames 3, 4, respectively. Bails 282 support, respectively, bearings 284, 285 (Figure 9), in which is journalled the subtotal shaft 237. A rotation of shaft 279 causes cams 280 to raise the subtotal shaft 237 into a position (indicated by dotted lines in Figures 8 and 12) wherein gears 286 fast on subtotal gears 236 are demeshed from driving gears 235 and are meshed with idler gears 287, 288 rotatable on a stationary shaft 289 mounted in frames 3, 4. The purpose of this arrangement is to connect the sub-total gears 236 with a grand total and printing mechanism, as will be described hereafter. Gears 286 forming part of the subtotal Amounts totalizing register and the subtotal Tickets counter mesh each with an idler 287 (meshed to a printing mechanism) and another idler 288 (meshed to a grand-total numeral wheel), whereas gears 286 of the subtotal Customers totalizing register mesh each with a single gear 288. Each of the idler gears 287, 288 is located by a detent 290 pivoted on a rod 291 and biased by a spring 292 anchored in a bar 293 (Figure 8) secured to frames 3, 4.

Fast on the subtotal shaft 237 is a gear 294 (Figures 9, 10 and 12) adapted to be driven for a full turn by a gear segment 295 secured to shaft 279. This operation, as indicated in the timing chart of Figure 16, takes place during a part of the revolution of shaft 279 after the cam 280 has raised the sub-total shaft 237 to mesh the gears 286 with gears 287, 288 as heretofore described. A conventional zeroising comb 296 (Figure 9) is shiftable in a keyway in the subtotal shaft 237 by a spring 297 into a sloped recess in the stationary bearing 284; this comb 296 has lugs 298 co-acting with zero studs 299 on subtotal gears 236. Rotation of gear 294 and shaft 237 first causes the comb 296 to ride up the sloped side of recess in bearing 284 and thus to shift axially so as to align lugs 298 with studs 299, whereupon lugs 298 pick up studs 299 and restore the subtotal gears 236 to their zero positions, thus clearing the subtotals and at the same time transmitting them to the idlers 287, 288; on completion of the clearing operation, spring 297 restores comb 296 to its normal axial position.

*Grandtotal mechanisms*

As shown in Figures 10 and 8, the grandtotal mechanisms comprise numeral wheels 300 to which are fixed gears 301 meshing with idlers 288; they are rotatable on a shaft 302 journalled in bearings 303, 304 in frames 3, 4. A customary zeroising comb 305 with lugs 306 co-acting with zero studs 307 on numeral wheels 300 is pressed by a spring 308 into a recess in bearing 304. There are three grandtotal mechanisms, namely amounts totalizing register, tickets counter, and customers totalizing register (see also Figure 2); they can be cleared by turning the grandtotal shaft 302 by means of a special key to be inserted into the right-hand end of the shaft, a suitable aperture being provided for this purpose in the machine cover 163. The numeral wheels 300 are visible through apertures 309 in cover 163.

*Grandtotal carry device*

The carry is effected in a conventional manner by one-tooth pinions 310 fast on numeral wheels 300 and coacting with rockers 311 mounted on a rod 312 (Figures 17 and 8) and located by plungers 313 biased by springs 314 inserted into bores in rockers 311. Tops of plungers 313 are wedge-shaped to co-operate with a rod 315 mounted, similarly to rod 312, in frames 3, 4, so that they hold the rockers 313 either as shown in Figure 17, viz. rocked towards the grand total shaft 302, or alternatively rocked away from this shaft. The rear ends of rockers 311 have cam faces 311' co-acting with swing levers 316 pivoted on pins 317 in plates 318 secured by a key 319 to a shaft 320 journalled in bearings 321 in frames 3, 4 (Figure 10). Springs 322 keep the swing levers 316 in line with rockers 311, adjacent to which on rod 315 are mounted idler gears 323 meshing with grandtotal gears 301 of the next higher denominations. Fast on shaft 320 is a gear 324 adapted to be driven by a gear segment 325 secured to shaft 279 (see also Figure 12).

Just before completing a turn, a one-tooth pinion 310 (Figure 17) causes the associated rocker 311 to swing towards the carry shaft 320, so that the cam face 311' is interposed in the path of the respective swing lever 316. When the carry shaft 320 is rotated by gear segment 325, this cam face 311' will rock the swing lever 316 sideways into engagement with idler 323 meshed to the next higher numeral wheel 300, and the swing lever 316 will shift the idler 323 one step, thus effecting the carry. Cams 326 formed on plates 318 serve to restore the rockers 311. It may be pointed out that for the sake of clearness only one carry device is shown in Figure 17, namely that controlled by the pence numeral wheel 300; actually there is one such carry device associated with each wheel 300, as shown in Figure 8, the various carry plates 318 being offset around the shaft 320 so as to work in progressive order beginning with the lowest denomination.

*Printing device*

Idler gears 287 each mesh with a gear segment 327 rockably mounted on a shaft 328 journalled in bearings 329 in frames 2, 3, 4. Integral with gear segments 327 are printing sectors 330 carrying in suitable slots type bars 331 (Figure 14) slidable in frames 332 secured to sectors 330. Type bars 331 are biased inwards by springs 333 mounted in frames 332. When the subtotal totalizing registers and counter are cleared as described above, their contents are transferred to the printing sectors 330, and the corresponding type bar 331 is adjusted by each sector in readiness for printing in line with a platen 334.

The first two printing sectors (on the left in Figure 10) are reserved for the number of waitress, and are adjusted by the operator when he sets up this number by turning the knobs 159, 160 (Figure 6). A gear 335 fast on sleeve 168 meshes with a gear segment 336 secured to a sleeve 337 connected to another sleeve 338 rotatable on shaft 328; fixed to this sleeve 338 is a gear segment 339 and a printing sector 340 reserved for the units of the number of waitress. Fast on shaft 164 is a gear 341 meshing with a gear segment 342 fixed to a gear segment 343 having a printing sector 344 reserved for the tens.

A hammer 345 (Figures 8 and 10) rockable on a shaft 346 supported in frames 3, 4 is provided for each of the printing sectors 330, 340, 344. Hammers 345 are biased by springs 347 anchored in a bar 348 on to cams 349 fast on a shaft 350 journalled in frames 3, 4. A further cam 351 is arranged to co-act with a lever 352 pivoted as at 353 and controlled by a spring 354; an extension 355 of lever 352 carries an aligning bar 356 adapted to co-operate with gear segments 327, 339, 343.

Fast on cam shaft 350 is a sprocket 357 (Figure 10) connected by a chain 358 to a sprocket 359 journalled as at 360 (see also Figure 12) in the frame 3; secured to this sprocket 359 is a gear 361 adapted to be driven by the gear segment 295 mentioned above. Rotation of cam shaft 350 first causes the aligning bar 356 to engage and to align the gear segments 327, 339, 343, whereupon the cams 349 release their associated hammers 345 in quick succession, which hammers strike the type bars 331 to produce imprints (Figure 2) on a paper strip 362; finally, the hammers 345 and the aligning bar 356 are restored by their respective cams 349, 351.

Printing sectors 330 are restored by a bar 363 secured to two brackets 364 fast on shaft 328. A crank 365 fast on shaft 328 is linked as at 366 to a rod 367 linked as at 368 to a crank 369 secured to the grandtotal carry shaft 320.

The sequence of the printing operation is illustrated in the timing chart of Figure 16.

*Paper and ribbon feed*

The platen 334 is rigidly mounted on shaft 370 journalled in bearings 371 (Figure 10) and having a knob 372 for hand feeding. Paper reel 362 on a sleeve 373 is rotatable on a shaft 374 mounted in recesses 375 (Figure 12) in frames 3, 4. Paper guides 376 (Figures 8 and 2) mounted on shafts 377, 378 serve to guide the paper between feed rollers 379, 380 fast on shaft 377, 378, respectively, journalled in frames 3, 4, and the platen 334. The paper can be torn off on a knife edge 381 secured to frames 3, 4.

Loosely mounted on the platen shaft 370 is a bail 382 linked as at 383 to a rod 384 linked at 385 (Figure 10) to the crank 365 mentioned above. Rockably mounted on the bail 382 is a pawl 386 (Figure 12) biased by a spring 387 anchored as at 388 into engagement with a ratchet wheel 389 fast on shaft 370. As the bail 382 is reciprocated by the rod 384, the pawl 386 turns the ratchet 389 and the platen 334 step-wise, and thus shifts the paper 362.

Ink ribbon 390 is mounted in customary reels 391, 392 (Figure 10) on shafts 393, 394 in brackets 395, 396 fixed to frames 3, 4 respectively. Shafts 393, 394 carry bevel gears 397, 398 adapted to mesh, respectively, with bevel gears 399, 400 fast on a shaft 401 slidably and rotatably mounted in frames 3, 4. Slidably keyed to shaft 401 is a pulley 402 driven by a belt 403 from a pulley 404 fast on the platen shaft 370. Knob 405 fast on shaft 401 serves to reverse the direction of ribbon feed by shifting the shaft 401 axially, so that the ribbon 390 is fed either by bevels 400, 398 or by bevels 399, 397. A spring 406 (Figure 12) secured to the frame 4 as at 407 serves to locate the shaft 401 in either of the two axial positions, while a stop 408 (Figures 10 and 8) fixed to the frame 3 prevents the pulley 402 from axial movement.

A flexible guide 409 fixed to bar 348 and pins 410 in brackets 395, 396 serve to guide the ribbon 390.

Operation

The whole sequence of operations will now be summarised.

The operator stacks up the tickets 1 in the container 7, 8, in the order of waitresses, and sets up the number of waitress pertaining to the uppermost lot by turning the knobs 159, 160. The operator then lifts up the feed lever 129 which starts the paper feed by engaging the clutch 120. Motor 112 then drives the paper feed through pulley 113, belt 114, pulley 115, clutch shaft 116, clutch 120, gears 133, 134, shaft 105, gears 110, 111, cam shaft 26, sprocket 51, chain 50, sprocket 49, shaft 47, sprocket 54, chain 55, sprockets 56, 57, and shafts 58, 59. The tickets 1 are fed by picker 44 into pairs of feed rollers 45, 46, 60, 66 and 61, 76. After passing the first pair of feed rollers, the tickets are adjusted and passed on to the control station 146, 152, where a beam of light checks up the number of waitress and verifies good condition of ticket and accuracy of printing and feeding. The tickets accepted by the control device are then scanned in the analysing station 197, 200 by a second beam of light, which transmits the impulses produced by the marks on the tickets to the magnet 205 controlling the four armatures 207—210 which operate the ratchet wheels 227 meshed to the subtotal gears 236 accordingly. The subtotal mechanism is driven in synchronism with the paper feed through sprocket 220, chain 219, sprocket 218, cam shaft 215, sprocket 234, chain 233, sprocket 232, shaft 229, sleeve 228, and frictional drive units 238—241.

When one lot of tickets pertaining to one waitress has been run through, the paper feed is stopped by a card 145, and the operator depresses the print lever 269, and thus initiates the rotation of the one-revolution clutch 259 which drives, through sprocket 276, chain 277, and sprocket 278 the shaft 279. This shaft when rotated clears the subtotal gears 236 by means of gear segmet 295 and gear 294, whereby their contents are rolled onto grandtotal wheels 300 and printing sectors 330, and releases hammers 345 (through gear 361, sprocket 359, chain 358, sprocket 357, cam shaft 350, and cams 349) to produce an imprint, whereupon gear segment 325 rotates shaft 320 to effect the grandtotal carry and at the same time to restore the printing sectors 330 and to shift paper strip 362 and ribbon 390. In this manner, the waitress' number, the number of tickets, and the amount per waitress are printed, whereas the two last named figures and the number of customers are transmitted to the grandtotal numeral wheels 300. Of course, if any of the tickets have been rejected by the control device, the information contained thereon must be added by hand to the printed figures.

This procedure is repeated for each waitress per shop or cashier, whereupon the amount of cash etc. is noted and written down by hand. The contents of the grandtotal counter and totalizing registers are noted, and cleared, by hand whenever required.

It will be evident that the tickets may be furnished with further information, for instance relating to the number of complete meals, or special dishes, and so forth. The amounts indicated on the tickets may be within any reasonable range and in any numerical system, the registering mechanism being arranged accordingly. The number of waitress may be replaced by other distinctive numbers. As mentioned above, the information carried on the tickets may refer to any sales or other business transactions, or to internal procedures, and so forth.

The machine according to the invention can be modified in various ways without departing from the spirit of this invention. For instance, the positions of lamps and photocells forming part of the control and analysing devices can be reversed. Instead of light, other kinds of radiant energy may be used, for example, infra-red radiation. The indications in index areas B on the tickets may be made by pencil, or ink, or stamp; alternatively, they may be punched by a suitable punch, the amplifier circuit of the analysing cell 200 being so arranged as to cause the magnet 205 to be energized when light falls upon the cell. Similarly, the distinctive marks 158 may be pre-punched, instead of being pre-printed. The index areas B and the distinctive marks 158 may be arranged on the tickets in any suitable manner. Instead of being actuated by light impinging through the tickets, the analysing device and/or the control device may be arranged to be operated by light reflected from the surface of the tickets.

What I claim is:

1. In a statistical machine controlled by records carrying information represented by differentially marked index areas arranged in a single line in denominational groups, a single stationary analysing device, means for feeding the records through the analysing device, a plurality of totalizing elements each associated with one of said groups of index areas, a plurality of counting elements for counting the number of records analysed by said analysing device, driving means for said totalizing and counting elements, a coupling operatively disposed between each of said elements and said driving means, a plurality of coupling actuators controlled by said analysing device, each actuator being associated with one group of said index areas and being controlled to render the respective coupling operative to drive the respective totalizing element when the analysing device is actuated by a mark in an index area of the respective group, locking means working in synchronism with said record feeding means to release each coupling actuator for operation by said analysing device only when the respective denominational group of index areas passes the analysing device, each actuator being operated by said locking means to render the respective coupling inoperative after the last index area of the respective group has passed the analysing device, means operatively associated with one of said actuators to render the coupling of the units counting element operative when this actuator is actuated by the analysing device, and escapement means for limiting the drive of said units counting element to one step at a time.

2. A statistical machine according to claim 1, wherein the said analysing device comprises a device sensitive to radiant energy, a source of radiant energy, and a mask adapted to reduce the illumination of said sensitive device to an area corresponding to an index area, and a single electromagnet controlling the said plurality of coupling actuators, the said sensitive device being connected to control the said electromagnet when actuated by a marked index area.

3. A statistical machine according to claim 1, wherein the said locking means comprise cams driven in synchronism with the record feeding means, each cam being operatively associated with one of said coupling actuators and being shaped so as to render its respective actuator free, if actuated by the analysing device, to render its respective coupling operative at any time during the passage of the index areas of the respective group through the analysing device, to cause the actuator to render the coupling inoperative and thus to stop the respective totalizing element shortly after the last index area of this group has passed the analysing device, and to render the actuator inoperative by the analysing device for the remainder of the operating cycle.

4. In a statistical machine according to claim 1, a second analyzing device co-operating with a combined identification and feed control mark on said records, means for setting up an identification pattern corresponding to a desired identification mark, and locking means controlled by said second analyzing device for rendering the said coupling actuators inoperative when at a predetermined moment during each operating cycle the result of analysis differs from that produced by a single record having the desired identification mark properly aligned with the said second analyzing device.

5. In a statistical machine according to claim 1, a second analyzing device co-operating with a combined identification and feed control mark on said records, said second analyzing device comprising a source of radiant energy, a device sensitive to radiant energy, set-up means for reducing the beam of radiant energy illuminating the said sensitive device to an identification pattern corresponding to a desired identification mark, locking means for rendering the said coupling actuators inoperative, and means controlled by said sensitive device for actuating the said locking means when the said sensitive device receives an amount of radiant energy which is either greater or smaller than that received in the case of a single record having the desired identification mark properly aligned with the said sensitive device.

6. In a statistical machine according to claim 1, a second analyzing device co-operating with a combined identification and feed control mark on said records, means for setting up an identification pattern corresponding to a desired identification mark, segregating means for records not having the desired identification mark and for badly aligned records, locking means for rendering the said coupling actuators inoperative, and means controlled by said second analyzing device for causing said segregating means and said locking means to operate when at a predetermined moment during each operating cycle the result of analysis differs from that produced by a single record having the desired identification mark properly aligned with the said second analyzing device.

DANIEL BROIDO.